(12) United States Patent
Kawahara et al.

(10) Patent No.: US 7,480,088 B2
(45) Date of Patent: Jan. 20, 2009

(54) DISPLAYING METHOD, DISPLAY ELEMENT AND DISPLAY DEVICE

(75) Inventors: Jun Kawahara, Kanagawa (JP); Yasuo Yamamoto, Kanagawa (JP); Kei Shimotani, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 380 days.

(21) Appl. No.: 11/330,178

(22) Filed: Jan. 12, 2006

(65) Prior Publication Data
US 2007/0063964 A1 Mar. 22, 2007

(30) Foreign Application Priority Data
Sep. 20, 2005 (JP) ............................. 2005-272505

(51) Int. Cl.
*G02F 1/153* (2006.01)
(52) U.S. Cl. ....................................... 359/268; 359/270
(58) Field of Classification Search .......... 359/265–275
See application file for complete search history.

(56) References Cited

U.S. PATENT DOCUMENTS
2006/0038799 A1* 2/2006 Yanaka et al. ................ 345/204

FOREIGN PATENT DOCUMENTS
EP 1 507 164 A1 2/2005
JP A 11-101994 4/1999

OTHER PUBLICATIONS

G. Sandmann, et al., "Preparation of silvernanoparticles on ITO surfaces by a double-pulse method", J. Electroanal. Chem., vol. 491, pp. 78-86 (2000).
Sun, Yugang et al., "Gold and Silver Nanoparticles: A Class Of Chromophores With Colors Tunable In The Range From 400 to 750 nm," Analyst, vol. 128, pp. 686-691, Apr. 4, 2003.

* cited by examiner

*Primary Examiner*—William C Choi
(74) *Attorney, Agent, or Firm*—Oliff & Berridge, PLC

(57) ABSTRACT

A displaying method includes forming nuclear crystals of a metal on an electrode, and depositing a metal on a surface of the nuclear crystals from a solution including a metallic ion, so as to form particles having a particle diameter corresponding to a display color.

10 Claims, 7 Drawing Sheets

DISPLAYING METHOD, DISPLAY ELEMENT AND DISPLAY DEVICE

BACKGROUND OF THE INVENTION

1. Field of the Invention

The present invention relates to a displaying method and a displaying device that execute display through deposition and dissolution of a metal.

2. Description of the Related Art

In recent years, in addition to a paper medium and an electronic displaying device, such an image displaying and recording medium is receiving attention as an image displaying device that is referred to as electronic paper or digital paper, which has advantages of both an electronic displaying device and paper.

There have been various kinds of electronic paper functioning based on displaying principles different from each other, which include electrolytic deposition type electronic paper executing display through deposition and dissolution of a metal.

What is advantageous in the electrolytic deposition type electronic paper in comparison to the other kinds of electronic paper includes a displayed image having a high contrast. There has been reported such a technique that a displayed image is colorized by using a color filter (described, for example, in JP-A-11-101994).

There has also been reported such a technique that the applied voltage is controlled to control the particle diameter of silver particles in nanometer order, which are frequently used in the electrolytic deposition type electronic paper (described, for example, in G. Sandmann, et al., "Preparation of silver nanoparticles on ITO surfaces by a double-pulse method", J. Electroanal. Chem., vol. 491, pp. 78-86 (2000)). It has also known that nanoparticles of gold or silver exhibit different colors depending on difference in particle diameter.

According to the technique described in JP-A-11-101994, however, there is such a problem that the use of a color filter lowers the reflectance in white color to lower the contrast.

Accordingly, the invention is to provide a displaying method and a displaying device of an electrolytic deposition type capable of executing color display with a high contrast.

SUMMARY OF THE INVENTION

According to an aspect of the present invention, a displaying method includes forming nuclear crystals of a metal on an electrode, and depositing the metal on a surface of the nuclear crystals from a solution including a metallic ion, so as to form particles having a particle diameter corresponding to a display color.

According to another aspect of the present invention, a display element includes a front substrate including a transparent material having a transparent first electrode, a back substrate disposed to face the front surface electrode, the back substrate including a second electrode, an electrolyte solution including a metallic ion sealed between the first electrode and the second electrode, a voltage applying section applying a voltage between the first electrode and the second electrode, and a controlling section controlling the voltage applying section to deposit a metal from the electrolyte solution including the metallic ion, so as to form the metal particles having a particle diameter corresponding to a display color on the first electrode.

According to yet another aspect of the present invention, a display device includes an array of display elements. Each of the display elements includes a front substrate including a transparent material having a transparent first electrode, a back substrate disposed to face the front surface electrode, the back substrate including a second electrode, an electrolyte solution including a metallic ion sealed between the first electrode and the second electrode, a voltage applying section applying a voltage between the first electrode and the second electrode, and a controlling section controlling the voltage applying section to deposit a metal from the electrolyte solution including the metallic ion, so as to form the metal particles having a particle diameter corresponding to a display color on the first electrode.

DETAILED DESCRIPTION OF THE INVENTION

The invention will be described with reference to the following embodiments, but the invention is not construed as being limited thereto.

First Embodiment (Constitution of Device)

Figure 1:
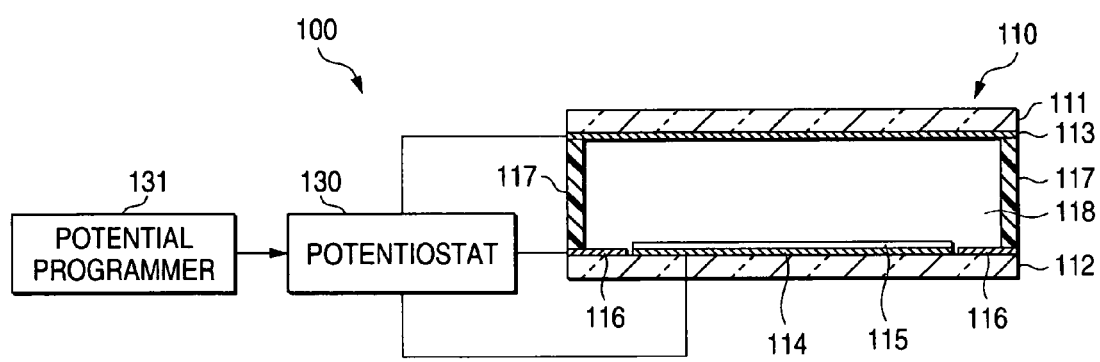
FIG. 1 is a cross sectional view showing a display device according to a first embodiment of the invention.

FIG. 1 is a cross sectional view showing a display device according to a first embodiment of the invention.

As shown in FIG. 1, the display device 100 is constituted by a transparent front substrate 111 and back substrate 112 formed of PET (polyethylene terephthalate) films and disposed to face each other, a transparent working electrode 113 and a counter electrode 114 formed of ITO and disposed on the inner surfaces of the front substrate 111 and the back substrate 112, respectively, a silver sputtered layer 115 provided on the surface of the counter substrate 114, a reference electrode 116 in a ring form provided to surround the counter electrode 114, a partitioning member 117 formed, for example, of an insulating material, such as a thermosetting resin, an electrolyte solution 118 containing silver as an electrolyte sealed between the front substrate 111 and the back substrate 112, a potentiostat 130 as a voltage applying section, and a potential programmer 131 as a controlling section.

Among the constitutional components of the displaying device 100, the front substrate 111, the back substrate 112, the working electrode 113, the counter electrode 114, the silver sputtered layer 115, the reference electrode 116, the partitioning member 117 and the electrolyte solution 118 are generically referred to as a displaying element 110.

In the first embodiment, descriptions will be made in understanding that the working electrode 113 corresponds to the first electrode in the first and second aspect of the invention, and the counter electrode 114 corresponds to the second electrode in the first and second aspect of the invention, but it is possible that the working electrode 113 corresponds to the second electrode, and the counter electrode 114 corresponds to the first electrode.

The reference electrode 116 may be provided on the front substrate 111, and the shape thereof is not limited to the ring form.

The electrolyte solution 118 contains $TiO_2$ colloid dispersed therein for improving the reflectance in white color.

The potentiostat 130 is connected to the working electrode 113, the counter electrode 114 and the reference electrode 116, and the potentiostat 130 applies a voltage with precise intensity between the working electrode 113 and the counter electrode 114 while the potential of the working electrode 113 is measured with the reference electrode 116 as a reference.

The potential programmer 131 designates the intensity and the application time of the voltage to the potentiostat 130. The potential programmer 131 also contains a voltage application program corresponding to the color displayed by the display device 100.

(Operation of Device)

Figure 2:
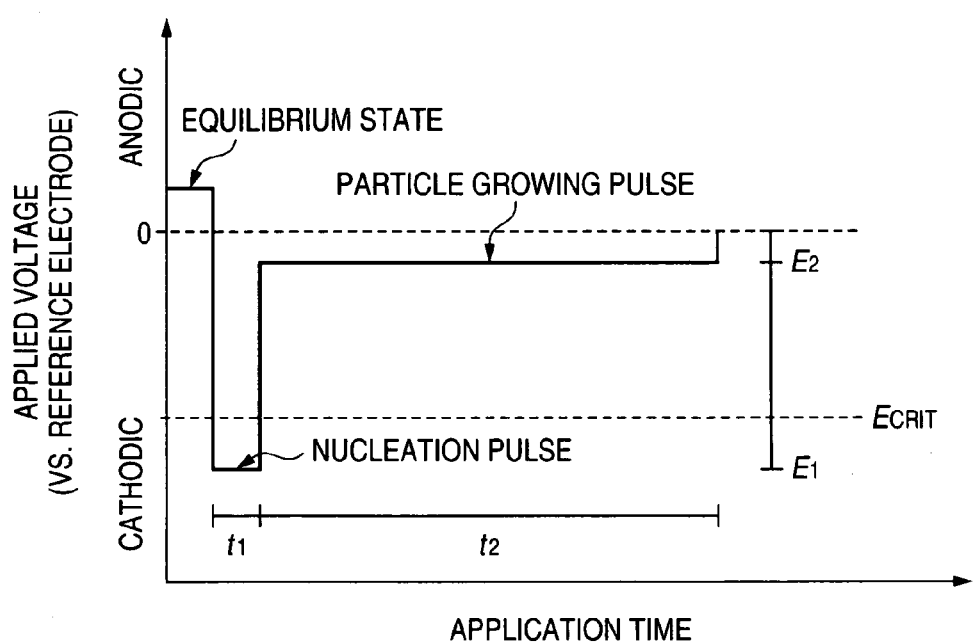
FIG. 2 is a graph showing a voltage application program contained in a potential programmer according to the first embodiment of the invention.
Figure 3A:
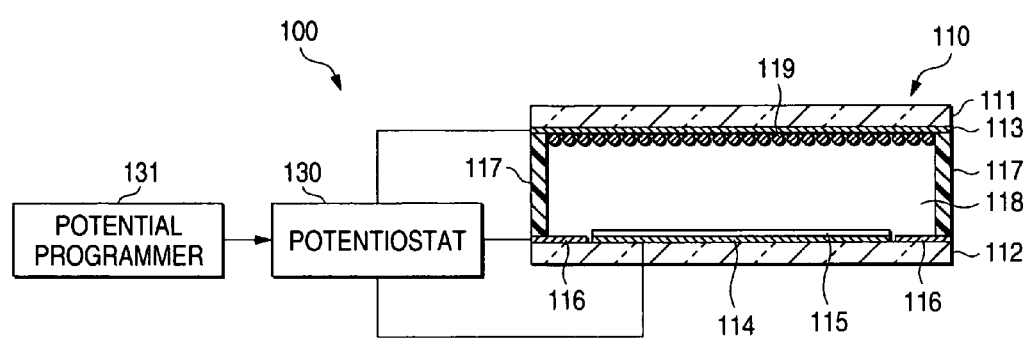
FIGS. 3A and 3B are cross sectional views showing an operation of the displaying device according to the first embodiment of the invention.
Figure 3B:
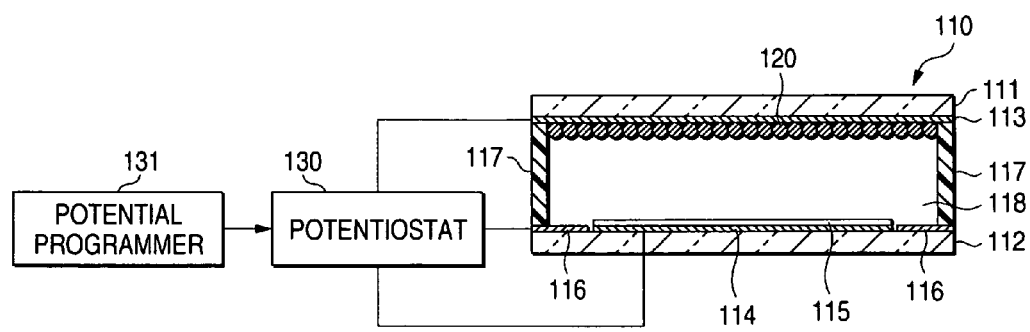

FIG. 2 is a graph showing the voltage application program contained in the potential programmer 131 according to the first embodiment of the invention. FIGS. 3A and 3B are cross sectional views showing an operation of the displaying device according to the first embodiment of the invention.

The display device 100 displays in white color in the initial state. This is because a user sees the white titanium oxide colloid dispersed in the electrolyte solution 118 through the front substrate 111.

When the user designates a color to be displayed on the displaying device 100 to the potential programmer 131, the potential programmer 131 controls the potentiostat 130 based on a voltage application program corresponding to the color as shown in FIG. 2.

The potential programmer 131 initially directs the potentiostat 131 having been maintained in an equilibrium state to apply a nucleation pulse potential having an intensity $E_1$ ($E_1 < E_{CRIT} < 0$) and an application time of $t_1$ to the working electrode 113. The symbol $E_{CRIT}$ represents a threshold voltage, and silver can be deposited by applying a negative voltage with respect to the threshold voltage.

According to the operation, a pulse voltage occurs between the working electrode 113 and the counter electrode 114 as shown in FIG. 2A, and silver is ionized from the silver sputtered layer 115 on the counter electrode 114 to be eluted in the electrolyte solution 118 and then deposited as crystal nuclei 119 on the working electrode 113.

At this time, the number of the crystal nuclei 119 can be controlled by adjusting the application time $t_1$ of the nucleation pulse potential. When the number of the crystal nuclei 119 is increased, the display density of the displaying device 100 is increased.

The potential programmer 131 then directs the potentiostat 131 to apply a particle growing pulse potential having an intensity $E_2$ ($E_1 < E_{CRIT} < E_2 < 0$) and an application time of $t_2$ to the working electrode 113.

According to the operation, a pulse voltage occurs between the working electrode 113 and the counter electrode 114, and silver is ionized from the silver sputtered layer 115 on the counter electrode 114 to be eluted in the electrolyte solution 118 and then deposited on the surface of the silver crystal nuclei 119 to form silver crystal particles 112.

At this time, the particle diameter of the silver crystal particles 112 can be controlled by controlling the deposited amount of silver on the surface of the silver crystal nuclei 119 through adjustment of the application time $t_2$ of the particle growing pulse potential. Upon changing the particle diameter of the crystal particles 112, a color corresponding to the particle diameter of the crystal particles 112 is displayed on the display device 100 through the effect of localized plasmon resonance.

In order to retrieve the initial state (white color) of the display device 100, a potential having sufficient intensity and application time is applied to the working electrode 113. According to the operation, the silver crystal particles 112 are ionized to be eluted in the electrolyte solution 118 and deposited on the silver sputtered layer 115, whereby the white titanium oxide colloid dispersed in the electrolyte solution 118 can be viewed through the front substrate 111.

(Advantages of First Embodiment)

According to the first embodiment, the voltage is applied by dividing into two steps (double pulse system), whereby the particle growing pulse potential can be adjusted to control the particle diameter of the crystal particles, and color display can be executed without decrease in contrast through the effect of localized plasmon resonance.

Furthermore, the number of crystal nuclei, i.e., the number of crystal particles, can be controlled by adjusting the nucleation pulse potential, whereby the display density of the displaying device 100 can be freely controlled. Upon increasing the density, display with high contrast can be executed, and upon decreasing the density, the energy necessary for executing display can be reduced to save the electric power consumption.

Second Embodiment

Figure 4:
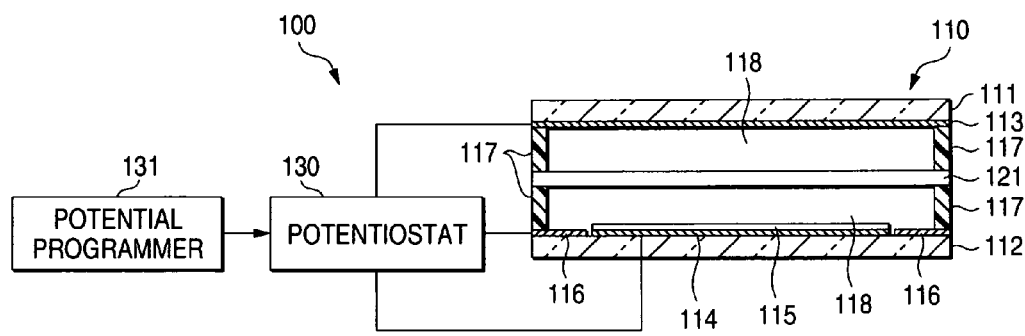
FIG. 4 is a cross sectional view showing a display device according to a second embodiment of the invention.

FIG. 4 is a cross sectional view showing a display device according to a second embodiment of the invention.

As shown in FIG. 4, the difference between the second embodiment and the displaying device 100 of the first embodiment resides in the presence of a white reflecting plate 121 provided between the front substrate 111 and the back substrate 112 for improving the reflectance in white color. The reflecting plate 121 has fine pores through which the electrolyte solution 118 can freely pass. The other constitution and operation of the displaying device 100 are the same as in the first embodiment, and thus descriptions thereof are omitted.

(Advantages of Second Embodiment)

According to the second embodiment, the reflecting plate 121 improves the reflectance in white color to obtain display with high contrast.

Third Embodiment

In a third embodiment of the invention, plural displaying elements according to the first embodiment corresponding to the number of pixels are arranged two-dimensionally to constitute an image displaying device. The constitution and operation of the respective displaying elements are the same as in the first embodiment, and thus descriptions thereof are omitted.

(Constitution of Displaying Device)

Figure 5:
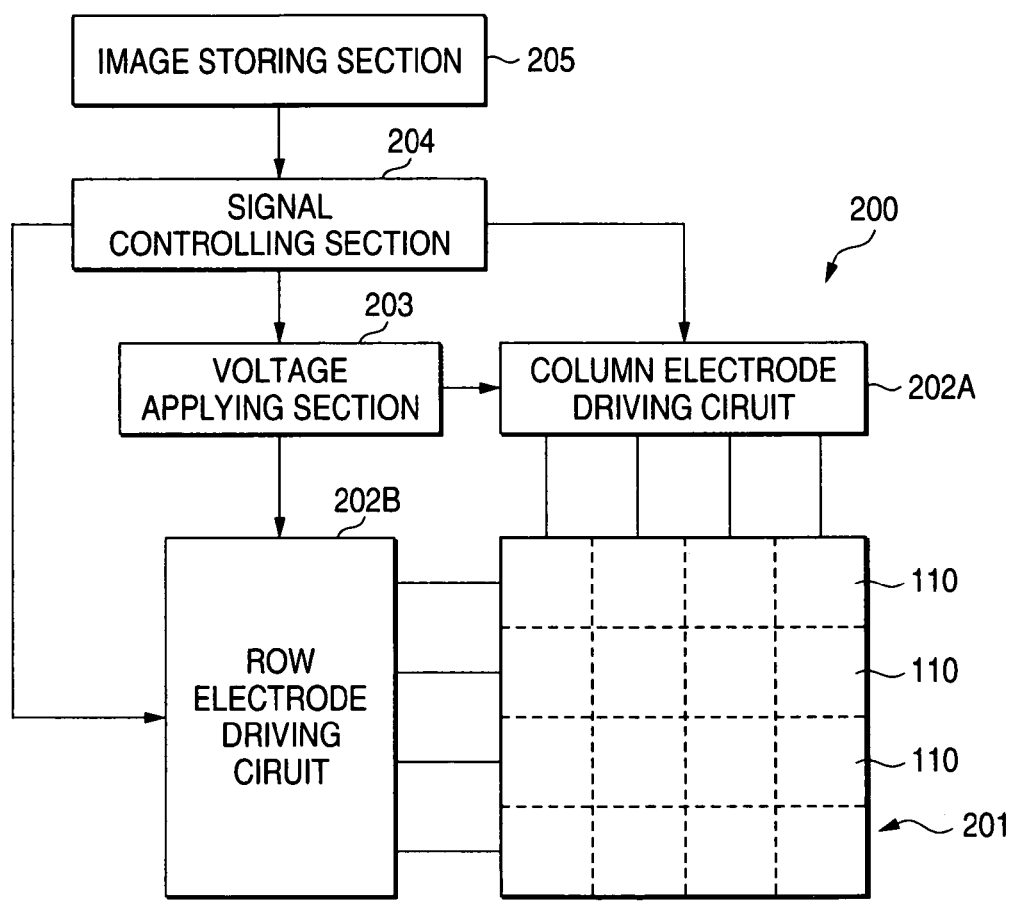
FIG. 5 is a plane view showing a constitution of an image displaying device according to a third embodiment of the invention.

FIG. 5 is a plane view showing a constitution of an image displaying device according to the third embodiment of the invention.

The image displaying device 200 is schematically constituted by an image displaying medium 201 containing displaying elements 110 arranged in an array with one displaying element 110 corresponding to one pixel, a column electrode driving circuit 202A and a row electrode driving circuit 202B selecting the displaying element 110 to be applied with a voltage, a voltage applying section 203 applying a voltage to the respective displaying elements 110 of the image displaying medium 201 through the column electrode driving circuit 202A and the row electrode driving circuit 202B, and a signal controlling section 204 controlling the column electrode driving circuit 202A, the row electrode driving circuit 202B and the voltage applying section 203 based on image data stored in an image storing section 205.

FIG. 5 shows an example where the displaying elements 110 are arranged in a 4×4 matrix, but the form and number of the arrangement are not limited thereto. For example, in the case where the displaying element 110 is in a polygonal shape, such as a hexagonal shape, a honeycomb structure may be employed.

The signal controlling section 204 is constituted by CPU, ROM, RAM, a timing signal generating circuit and the like. The CPU controls the column electrode driving circuit 202A, the row electrode driving circuit 202B and the voltage applying section 203 according to a program stored in the ROM to apply a voltage between the working electrode 113 and the counter electrode 114 of the displaying element 110 corresponding to the target pixel based on image data stored in the image storing section 205.

Specifically, the voltage applied to the respective displaying elements 110 is a double pulse voltage containing a particle growing pulse voltage having an application time corresponding to the colors of the pixels contained in the image data. The signal controlling section 204 has the function of the potential programmer 131 in the first embodiment.

The voltage applying section 203 is connected to the reference electrodes of the respective displaying elements 110, and the intensity of the applied voltage is precisely measured to execute display in the target color on the respective displaying element 110. The voltage applying section 203 has the function of the potentiostat 130 in the first embodiment.

The image storing section 205 may be a recording medium, such as CD-ROM and a rewritable flash memory module, or in alternative, image data may be input through a network, such as LAN (local area network).

Apart or the whole of the column electrode driving circuit 202A, the row electrode driving circuit 202B, the voltage applying section 203, the signal controlling section 204 and the image storing section 205 may be in the form of an external unit capable of being connected to the image displaying device 200.

The column electrode driving circuit 202A applies a voltage supplied from the voltage applying section 203 to the target working electrode 113 based on the timing signal and the image signal from the signal controlling section 204. The row electrode driving circuit 202B applies a voltage supplied from the voltage applying section 203 to the target counter electrode 114 based on the timing signal and the image signal from the signal controlling section 204.

The working electrodes 113 and the counter electrodes 114 are connected to the column electrode driving circuit 202A and the row electrode driving circuit 202B through plural row electrodes and plural column electrodes orthogonal to each other, and drive the pixels by passive matrix driving (simple matrix driving). In alternative, the working electrodes 113 and the counter electrodes 114 may drive the pixels by active matrix driving by using a common electrode and plural pixel electrodes, and connecting active elements, such as TFT elements, at intersecting points of plural data lines and plural scanning lines orthogonal to each other.

(Advantages of Third Embodiment)

According to the third embodiment, plural displaying elements 110 of the first embodiment are arranged to enable production of an image displaying device 200 capable of executing color display without decrease in contrast.

The invention is not limited to the aforementioned embodiments, and various modifications may be made therein unless the gist of the invention is deviated.

Furthermore, the constitutional elements of the aforementioned embodiments may be arbitrarily combined unless the gist of the invention is deviated.

The invention will be described in more detail with reference to the following example, but the invention is not construed as being limited thereto.

EXAMPLE 1

In Example 1, a displaying device according to the first embodiment is produced and subjected to an operation test.

(Production of Displaying Device)

A working electrode 113 formed of ITO having a thickness of 200 nm and an area of 1.5 cm$^2$ is formed on a front substrate 111 formed of borosilicate glass having a thickness of 1 mm. A counter electrode 114 formed of platinum and a reference electrode 116 formed of gold are formed on a back substrate 112 formed of borosilicate glass having a thickness of 1 mm. A silver sputtered layer 115 is formed on the counter electrode 114.

Potassium nitrate and silver nitrate are dissolved in ethanol at a concentration of 0.5 mol/L, respectively, to obtain a solution. Titanium oxide in an amount 1.2 times the solution is added to the solution, followed by stirring, to obtain an electrolyte solution 118.

The electrolyte solution 118 is held between the front substrate 111 and the back substrate 112 through a partitioning member 117 having a height of 100 μm.

As a controlling section and a voltage applying section, a galvanostat/potentiostat (Model 1263A, produced by Seiko EG&G Co., Ltd.) having both the functions thereof is used.

(Operation of Displaying Device)

In a state where no voltage is applied, the displaying elements 110 display white color, which is the color of the titanium oxide colloid dispersed in the electrolyte solution 118.

Figure 6A:
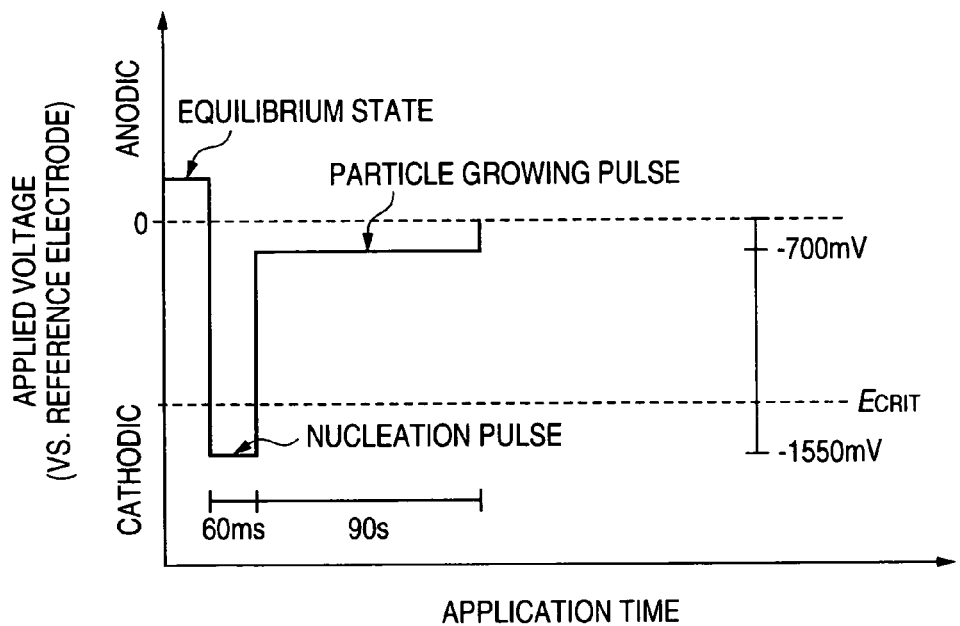
FIG. 6A is a graph showing a voltage application program contained in a potential programmer in Example 1.

FIG. 6A is a graph showing the voltage application program contained in the potential programmer in Example 1.

As shown in FIG. 6A, a nucleation pulse potential having an intensity $E_1$ of −1,550 mV (vs. reference electrode) and an application time $t_1$ of 60 ms and a particle growing pulse potential having an intensity $E_2$ of −700 mV (vs. reference electrode) and an application time $t_1$ of 90 s are applied to the working electrodes 113, whereby the display element 110 displays yellow color (absorption peak wavelength: ca. 533 nm). Upon observation of the surface of the working electrode 113 with anatomic force microscope, silver crystal particles 112 having an average particle diameter of 10 nm are observed.

Subsequently, a potential having an intensity of −650 mV (vs. reference electrode) is applied to the working electrodes 113, whereby the silver crystal particles 112 on the working electrode 113 are dissolved through oxidation, and the yellow color is erased to retrieve the white color of titanium oxide.

EXAMPLE 2

In Example 2, a displaying device according to the first embodiment is produced and subjected to an operation test as similar to Example 1. The production of the displaying device is the same as in Example 1, and thus descriptions thereof are omitted.

(Operation of Displaying Device)

In a state where no voltage is applied, the displaying elements 110 display white color, which is the color of the titanium oxide colloid dispersed in the electrolyte solution 118.

Figure 6B:
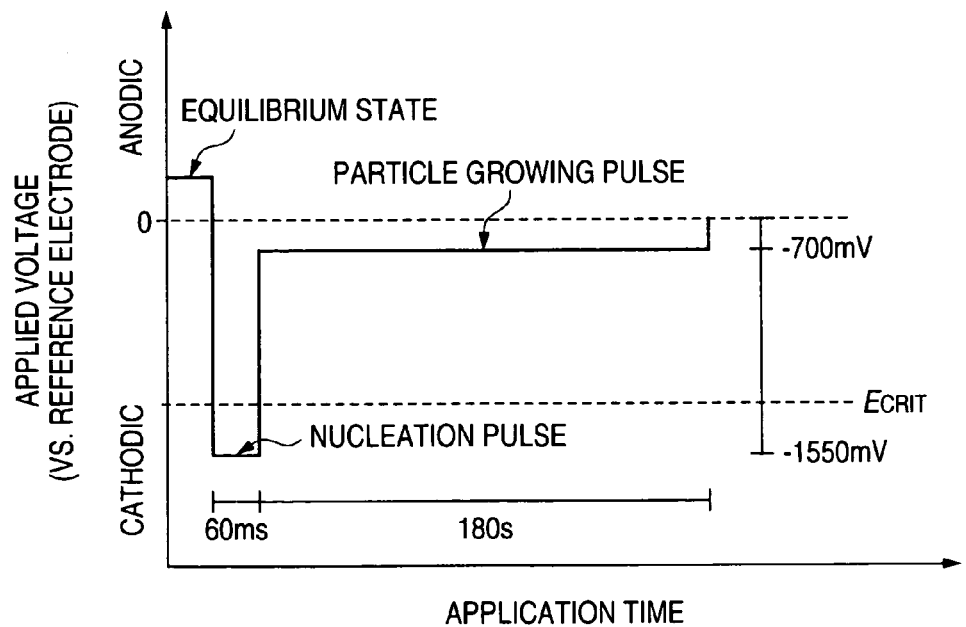
FIG. 6B is a graph showing a voltage application program contained in a potential programmer in Example 2.

FIG. 6B is a graph showing the voltage application program contained in the potential programmer in Example 2.

As shown in FIG. 6B, a nucleation pulse potential having an intensity $E_1$ of −1,550 mV (vs. reference electrode) and an application time $t_1$ of 60 ms and a particle growing pulse potential having an intensity $E_2$ of −700 mV (vs. reference electrode) and an application time $t_1$ of 180 s are applied to the working electrodes 113, whereby the display element 110 displays blue color (absorption peak wavelength: ca. 651 nm). Upon observation of the surface of the working electrode 113 with anatomic force microscope, silver crystal particles 112 having an average particle diameter of 40 nm are observed.

Subsequently, a potential having an intensity of −650 mV (vs. reference electrode) is applied to the working electrodes 113, whereby the silver crystal particles 112 on the working electrode 113 are dissolved through oxidation, and the blue color is erased to retrieve the white color of titanium oxide.

As Comparative Examples, an ordinary single pulse voltage is applied to the display device of Example 1 instead of the double pulse voltage, and the operation thereof is investigated. The production of the displaying device is the same as in Example 1, and thus descriptions thereof are omitted.

Comparative Example 1

Figure 7A:
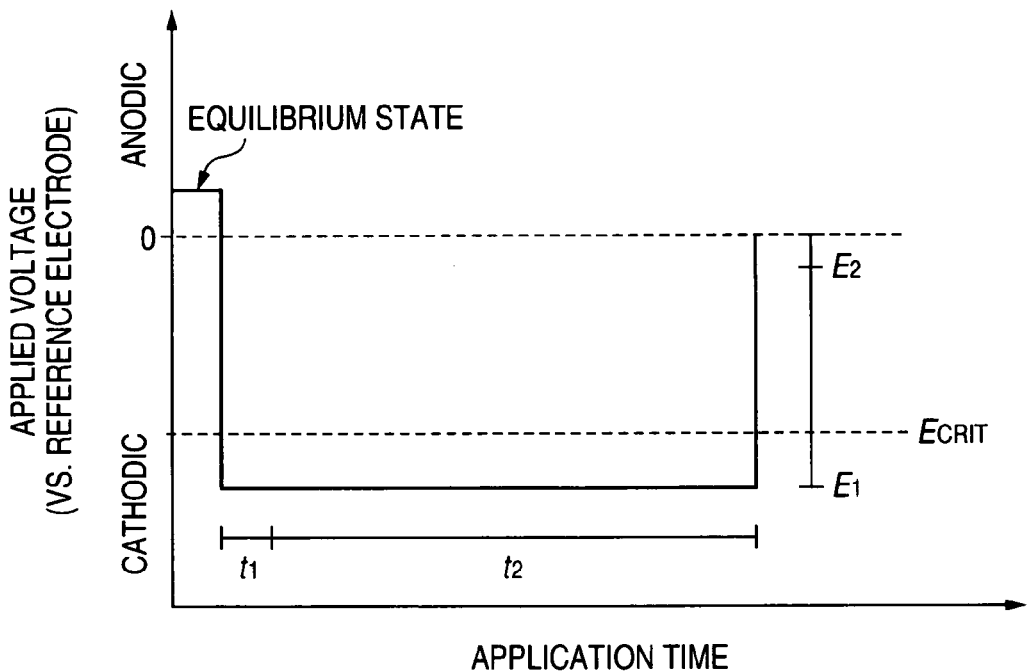
FIG. 7A is a graph showing a voltage application program contained in a potential programmer in Comparative Example 1.

FIG. 7A is a graph showing the voltage application program contained in the potential programmer in Comparative Example 1.

As shown in FIG. 7A, a potential having an intensity $E_1$ of −1,550 mV (vs. reference electrode) and an application time $t_1$ of 60 ms (which corresponds to the nucleation pulse potential in Example 1) is applied to the working electrodes 113, whereby the display element 110 displays black color.

Comparative Example 2

Figure 7B:
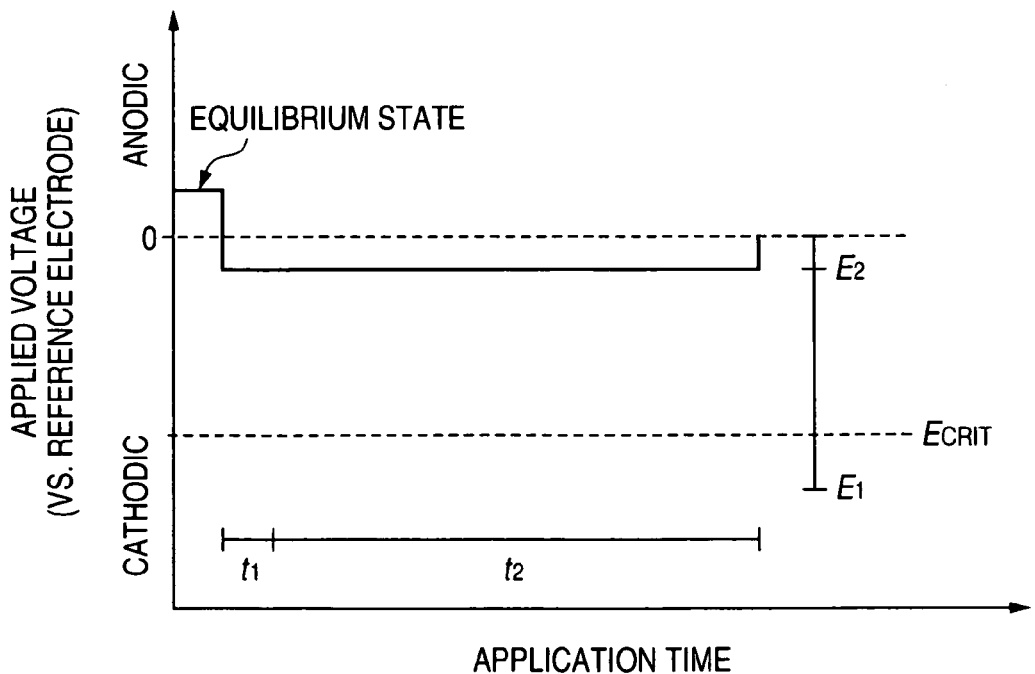
FIG. 7B is a graph showing a voltage application program contained in a potential programmer in Comparative Example 2.

FIG. 7B is a graph showing the voltage application program contained in the potential programmer in Comparative Example 2.

As shown in FIG. 7B, a potential having an intensity $E_1$ of −700 mV (vs. reference electrode) and an application time $t_1$ of 90 s (which corresponds to the particle growing pulse potential in Example 1) is applied to the working electrodes 113, whereby no change is observed in the display element 110.

It is confirmed from the results of Comparative Examples 1 and 2 that no color display can be obtained upon applying a single pulse voltage to the display device 100.

According to the first aspect of the invention, an electrolytic deposition type displaying device can execute color display with a high contrast by controlling the particle diameter of the metallic particles.

It is possible that the first step contains a step of applying a first applied voltage between the first electrode and a second electrode disposed to face the first electrode, so as to form the nuclear crystals from the solution.

It is possible that the first step contains a step of providing the nuclear crystals of the metal on the first electrode in advance.

It is possible that the second step contains a step of applying a second applied voltage between the first electrode and a second electrode disposed to face the first electrode, so as to deposit the metal from the solution.

The second applied voltage is preferably smaller than the first applied voltage.

The nuclear crystals can be controlled in number by controlling the application time of the first applied voltage.

The display density of the displayed image can be changed by controlling the nuclear crystals in number.

The particle diameter can be controlled by controlling the application time of the second applied voltage. The is displayed color can be changed by controlling the deposition amount.

According to the second aspect of the invention, such an electrolytic deposition type display device can be provided that can execute color display with a high contrast by controlling the particle diameter of the metallic particles.

The displaying device may contain a reference electrode, whereby the potential of the first electrode or the second electrode can be precisely controlled by using the reference electrode as a reference.

The electrolyte solution may contain white colloidal particles scattering light dispersed therein. The displaying device may further contain a white reflecting plate reflecting light between the first electrode and the second electrode. According to the configurations, the reflectance in white color can be improved.

Gold or silver may be used as the metal.

The electrolyte solution may contain a supporting electrolyte for improving the conductivity of the solution. Examples of the supporting electrolyte include a lithium salt, a potassium salt, a sodium salt, a tetraalkyl quaternary ammonium salt, a tetraethylammonium perchlorate salt, a tetrabutylammonium fluoroborate salt, a tetrabutylammonium perchlorate salt and a tetrabutylammonium halide salt.

The electrolyte solution may contain, as a reducing agent, an ascorbic acid compound and a trialkyl alcohol amine.

Examples of a solvent of the electrolytic solution include sulfolane, dimethylformamide, dimethylacetamide, dimethylsulfoxide, N-methylpyrrolidone, 2-pyrrolidone, N-methylformamide, acetonitrile, tetrahydrofuran, propylene carbonate, ethylene carbonate, isopropyl alcohol and ethyl alcohol.

Examples of the front substrate and the back substrate include a quartz glass plate, white glass plate, and a film or a plate of a polymer, such as polyester, polyimide, polymethyl methacrylate, polystyrene, polypropylene, polyethylene, nylon, polyvinyl chloride, polyvinylidene chloride, polycarbonate, polyether sulfone and a cellulose derivative.

Examples of the first electrode and the second electrode include ITO (indium tin oxide), tin oxide, indium oxide, magnesium oxide and zinc oxide.

Examples of the reference electrode include a noble metal, such as platinum, palladium and gold.

Examples of the reflecting plate include titanium dioxide, calcium carbonate, silica, magnesium oxide and aluminum oxide. The reflecting plate necessarily has fine pores through which the electrolyte solution can freely pass.

According to the invention, the particle diameter of the metallic particles is controlled to provide a displaying method and a displaying device capable of executing color display without decrease in contrast.

The entire disclosure of Japanese Patent Application No. 2005-272505 filed on Sep. 20, 2005 including specification, claims, drawings and abstract is incorporated herein by reference in its entirety.

What is claimed is:

1. A displaying method comprising:
    forming nuclear crystals of a metal on an electrode;
    depositing the metal on a surface of the nuclear crystals from a solution including a metallic ion, so as to form particles having a particle diameter corresponding to a display color,
    applying a first applied voltage between a first electrode as the electrode and a second electrode disposed to face the first electrode, so as to form the nuclear crystals from the solution,
    applying a second applied voltage between the first electrode and the second electrode, so as to deposit the metal from the solution,
    controlling the number of the nuclear crystals by controlling an application time of the first applied voltage, and
    controlling the particle diameter of the particles by controlling an application time of the second applied voltage.

2. The displaying method as claimed in claim 1, wherein the metal is gold or silver.

3. The displaying method as claimed in claim 1, wherein the second applied voltage is smaller than the first applied voltage.

4. A display element comprising:
    a front substrate including a transparent material having a transparent first electrode;
    a back substrate disposed to face the front substrate, the back substrate including a second electrode;
    an electrolyte solution including a metallic ion sealed between the first electrode and the second electrode;
    a voltage applying section applying a voltage between the first electrode and the second electrode; and
    a controlling section controlling the voltage applying section to deposit metal particles from the electrolyte solution including the metallic ion, so as to form the metal particles having a particle diameter corresponding to a display color on the first electrode, the controlling section controlling the voltage applying section to:
    (i) apply a first applied voltage between the first electrode and the second electrode disposed, so as to form nuclear crystals from the electrolyte solution,
    (ii) apply a second applied voltage between the first electrode and the second electrode, so as to deposit the metal from the electrolyte solution,
    (iii) control the number of the nuclear crystals by controlling an application time of the first applied voltage, and
    (iv) control the particle diameter of the particles by controlling an application time of the second applied voltage.

5. The display element as claimed in claim 4, wherein the displaying device further includes a reference electrode used as a reference of a potential of the first electrode or the second electrode.

6. The display element as claimed in claim 4, wherein the electrolyte solution includes white colloidal particles scattering light dispersed therein.

7. The display element as claimed in claim 4, wherein the displaying device further includes a white reflecting plate reflecting light between the first electrode and the second electrode.

8. The display element as claimed in claim 4, wherein the metal is gold or silver.

9. The display element as claimed in claim 4, wherein
    a sputtered layer is disposed on the second electrode, and
    the sputtered layer is made of a metal.

10. A display device comprising an array of display elements, wherein each of the display elements includes:
    a front substrate including a transparent material having a transparent first electrode;
    a back substrate disposed to face the front substrate, the back substrate including a second electrode;
    an electrolyte solution including a metallic ion sealed between the first electrode and the second electrode;
    a voltage applying section applying a voltage between the first electrode and the second electrode; and
    a controlling section controlling the voltage applying section to deposit a metal particles from the electrolyte solution including the metallic ion, so as to form the metal particles having a particle diameter corresponding to a display color on the first electrode, the controlling section controlling the voltage applying section to:
    (i) apply a first applied voltage between the first electrode and the second electrode, so as to form nuclear crystals from the electrolyte solution,
    (ii) apply a second applied voltage between the first electrode and the second electrode, so as to deposit the metal from the electrolyte solution,
    (iii) control the number of the nuclear crystals by controlling an application time of the first applied voltage, and
    (iv) control the particle diameter of the particles by controlling an application time of the second applied voltage.

* * * * *